(12) United States Patent
Cornell

(10) Patent No.: US 9,092,907 B2
(45) Date of Patent: Jul. 28, 2015

(54) IMAGE SHADER USING TWO-TIERED LOOKUP TABLE FOR IMPLEMENTING STYLE ATTRIBUTE REFERENCES

(75) Inventor: Brian Cornell, Kenmore, WA (US)

(73) Assignee: GOOGLE INC., Mountain View, CA (US)

( * ) Notice: Subject to any disclaimer, the term of this patent is extended or adjusted under 35 U.S.C. 154(b) by 732 days.

(21) Appl. No.: 13/174,351

(22) Filed: Jun. 30, 2011

(65) Prior Publication Data

US 2015/0054842 A1    Feb. 26, 2015

(51) Int. Cl.
*G06T 15/50* (2011.01)

(52) U.S. Cl.
CPC .................. *G06T 15/506* (2013.01)

(58) Field of Classification Search
None
See application file for complete search history.

(56) References Cited

U.S. PATENT DOCUMENTS

| 6,917,878 | B2 * | 7/2005 | Pechatnikov et al. | 701/411 |
| 7,136,077 | B2 * | 11/2006 | D'Amora et al. | 345/601 |
| 2004/0208370 | A1 * | 10/2004 | Whatmough | 382/173 |
| 2006/0069790 | A1 * | 3/2006 | Surana | 709/230 |
| 2011/0316854 | A1 * | 12/2011 | Vandrovec | 345/420 |

* cited by examiner

*Primary Examiner* — Edward Martello
(74) *Attorney, Agent, or Firm* — Marshall, Gerstein & Borun LLP (57) ABSTRACT

A graphics or image rendering system, such as a map image rendering system, receives image data from an image database, such as a map database, in the form of vector data having image features defined as sets of vertex data. The vertex data includes location data as well as an attribute reference pointer variable value that references a first lookup table, in the form of a texture map, which is sent to or generated in the image rendering system. The attribute reference variable value stored in the first lookup table is then used to reference a second lookup table, which may also be in the form of a texture map, to determine the specific values for a plurality of vertex attributes or properties, as stored in the second look up table. The image rendering system thus processes the vector data in a manner that allows for minimal data to be sent to the image rendering system from the image database or between processors of the image rendering device, as this system enables multiple vertex properties to be specified and easily changed by changing a single attribute reference pointer variable value for each vertex data point.

32 Claims, 4 Drawing Sheets

|  | Attribute | Object Type | Location | | |
|---|---|---|---|---|---|
|  |  |  | X | Y | Z |
| 0 | Style 1 | Road | 14 | 56 | 24 |
| 1 | Style 1 | Road | 14 | 22 | 19 |
| 2 | Style 1 | Road | 18 | 72 | 44 |
| 3 | Style 2 | Area | 19 | 13 | 23 |
| ⋮ | ⋮ | ⋮ | ⋮ | ⋮ | ⋮ |
| 97 | Style 14 | Text Box | 56 | 12 | 31 |
| 98 | Style 14 | Text Box | 56 | 44 | 28 |

Vertex Data Point #

FIG. 3A

Style #

|  | 0 | 1 | 2 | 3 | 4 | ... | N |
|---|---|---|---|---|---|---|---|
| 1 | 28 | 62 | 97 | 44 | 16 |  | 13 |
| 2 | 7 | 42 | 43 | 12 | 18 |  | 11 |
| 3 | . | . | . | . | . |  | 9 |
| 4 | . | . | . | . | . |  | 7 |
| ⋮ |  |  |  |  |  |  |  |
| 15 | . | . | . | . | . |  | . |

Vertex Attribute #

Feature #

| 1 | 2 | 3 | 4 | 5 | 6 | ... | N |
|---|---|---|---|---|---|---|---|
| 54 | 12 | 36 | 54 | 12 | 21 |  | 19 |

IMAGE SHADER USING TWO-TIERED LOOKUP TABLE FOR IMPLEMENTING STYLE ATTRIBUTE REFERENCES

FIELD OF TECHNOLOGY

The present disclosure relates to image rendering systems, such as electronic map display systems, and more specifically to an image rendering engine that uses one or more lookup tables to determine image attributes to be used in generating an image on a display screen using an image shader.

BACKGROUND

Digital maps are found in and may be displayed by a wide variety of devices, including mobile phones, car navigation systems, hand-held GPS units, computers, and many websites. Although digital maps are easy to view and to use from an end-user's perspective, creating a digital map is a difficult task and can be a time-consuming process. In particular, every digital map begins with storing, in a map database, a set of raw data corresponding to millions of streets and intersections and other features to be displayed as part of a map. The raw map data that is stored in the map database and that is used to generate digital map images is derived from a variety of sources, with each source typically providing different amounts and types of information. This map data must therefore be compiled and stored in the map database before being accessed by map display or map rendering applications and hardware.

There are, of course, different manners of digitally rendering map images (referred to as digital map images) based on map data stored in a map database. One method of rendering a map image is to store map images within the map database as sets of raster or pixelated images made up of numerous pixel data points, with each pixel data point including properties defining how a particular pixel in an image is to be displayed on an electronic display device. While this type of map data is relatively easy to create and store, the map rendering technique using this data typically requires a large amount of storage space for comprehensive digital map images, and it is difficult to manipulate the digital map images as displayed on a display device in very many useful manners.

Another, more flexible methodology of rendering images uses what is traditionally called vector image data. Vector image data is typically used in high-resolution and fast-moving imaging systems, such as those associated with gaming systems, and in particular three-dimensional gaming systems. Generally speaking, vector image data (or vector data) includes data that defines specific image objects or elements (also referred to as primitives) to be displayed as part of an image via an image display device. In the context of a map image, such image elements or primitives may be, for example, individual roads, text labels, areas, text boxes, buildings, points of interest markers, terrain features, bike paths, map or street labels, etc. Each image element is generally made up or drawn as a set of one or more triangles (of different sizes, shapes, colors, fill patterns, etc.), with each triangle including three vertices interconnected by lines. Thus, for any particular image element, the image database stores a set of vertex data points, with each vertex data point defining a particular vertex of one of the triangles making up the image element. Generally speaking, each vertex data point includes data pertaining to a two-dimensional or a three-dimensional position of the vertex (in an X, Y or and X, Y, Z coordinate system, for example) and various vertex attributes defining properties of the vertex, such as color properties, fill properties, line width properties for lines emanating from the vertex, etc.

During the image rendering process, the vertices defined for various image elements of an image to be rendered are provided to and are processed in one or more image shaders which operate in conjunction with a graphics processing unit (GPU), such as a graphics card or a rasterizer, to produce a two-dimensional image on a display screen. Generally speaking, an image shader is a set of software instructions used primarily to calculate rendering effects on graphics hardware with a high degree of flexibility. Image shaders are well known in the art and various types of image shaders are available in various application programming interfaces (APIs) provided by, for example, OpenGL and Direct3D, to define special shading functions. Basically, image shaders are simple programs in a high level programming language that describe or determine the traits of either a vertex or a pixel. Vertex shaders, for example, define the traits (e.g., position, texture coordinates, colors, etc.) of a vertex, while pixel or fragment shaders define the traits (color, z-depth and alpha value) of a pixel. A vertex shader is called for each vertex in an image element or primitive so that, for each vertex input into the vertex shader, the vertex shader produces one (updated) vertex output. Each vertex output by the vertex shader is then rendered as a series of pixels onto a block of memory that will eventually be sent to a display screen.

As a more particular example of image shader technology, Direct3D and OpenGL graphic libraries use three basic types of shaders including vertex shaders, geometry shaders, and pixel or fragment shaders. Vertex shaders are run once for each vertex given to the graphics processor. As noted above, the purpose of a vertex shader is to transform a position of a vertex in a virtual space to the two-dimensional coordinate at which it appears on the display screen (as well as a depth value for the z-buffer of the graphics processor). Vertex shaders can manipulate properties such as position, color, and texture coordinates, but cannot create new vertices. The output of the vertex shader is provided to the next stage in the processing pipeline, which is either a geometry shader if present or the rasterizer. Geometry shaders can add and remove vertices from a mesh of vertices and can be used to generate image geometry procedurally or to add volumetric detail to existing images that would be too costly to process on a central processing unit (CPU). If geometry shaders are being used, the output is then sent to the rasterizer. Pixel shaders, which are also known as fragment shaders, calculate the color and light properties of individual pixels in an image. The input to this stage comes from the rasterizer, and the fragment shaders operate to fill in the pixel values of the polygons being sent through the graphics pipeline. Fragment shaders are typically used for scene lighting and related effects such as color toning. There is not a one-to-one relationship between calls to the fragment shader and pixels on the screen as fragment shaders are often called many times per pixel because they are called for every image element or object that is in the corresponding space, even if that image object is occluded. However, if the occluding object is drawn first, the occluded pixels of other objects will generally not be processed in the fragment shader.

The use of vector graphics can be particularly advantageous in a mobile map system in which image data is sent from a centralized map database via a communications network (such as the Internet, a wireless network, etc.) to one or more mobile or remote devices for display. In particular, vector data, once sent to the receiving device, may be more easily scaled and manipulated (e.g., rotated, etc.) than pixelated raster image data. However, the processing of vector data is typically much more time consuming and processor intensive on the image rendering system that receives the data. Moreover, using vector image data that provides a higher level of detail or information to be displayed in a map leads to a higher amount of vector data or vertices that need to be sent to the map rendering system from the map database that stores this information, which can result in higher bandwidth requirements or downloading time in some cases.

Unfortunately, there are certain image processing actions, such as changing colors, fill properties, line widths, etc. of image objects or elements on a displayed map image that require the downloading of new vector data (with the new properties or vertex attributes) from the map database or from the application or system creating the vector data points. As a result, it may be relatively time consuming to simply change style properties of rendered images, such as the colors or fill patterns of image elements (such as roads, for example), the line widths used to display image element outlines, text, etc., because doing so means that new vector data, with the new vertex attributes defining these new properties, must be sent to the rendering engine from the map database or other application. As a result, it is still relatively difficult to change or modify vector images created using vector data to perform simple visual modifications of features within the images themselves at the image rendering device, such as changing properties of map elements like line widths, color properties, etc.

SUMMARY

A computer-implemented method for rendering an image on a display device includes obtaining, at a computer device, vector data having a set of vertex data points, each vertex data point including location information data and a value for an attribute reference pointer variable. The method also includes storing a first lookup table having an attribute reference value stored for each of a set of different values of the attribute reference pointer variable and storing a second lookup table having a set of vertex attribute values for each of a plurality of attribute reference values, wherein the set of vertex attribute values for each of the attribute reference values includes a value for each of a multiplicity of different vertex attributes. The method renders an image by first executing an image shader on the computer device to use the first and second lookup tables to determine values for each of the multiplicity of vertex attributes of one or more of the vertex data points based on the value for the attribute reference pointer variable of the vertex data point. The image shader operates to produce image shader outputs based on the location information data and the vertex attribute values of each of the set of vertex data points. Thereafter, the method processes each of the image shader outputs to render an image on the display device based on the received vector data.

If desired, obtaining the vertex data points may include downloading the vertex data points from an image database via an electronic communications network with or without the attribute reference pointer variable values and/or may include associating a value for the attribute reference pointer variable for the vertex data points at the computer device. Moreover, the first lookup table and the second lookup table may be received, via the electronic communications network, from a server connected to the image database and/or may be generated at the computer device. In one embodiment, each vertex data point may include location information data in the form of two-dimensional coordinate values specifying a two-dimensional location of a vertex in virtual space and the lookup table may be configured as a two-dimensional texture map encoded with vertex attribute data. The multiplicity of vertex attributes may include one or more of a color, a fill pattern, and a line width. Moreover, processing each of the image shader outputs in the rasterizer may include using a vertex or a fragment shader to render the image on the display device.

In another embodiment, an image rendering engine includes a communications network interface, one or more processors, one or more memories coupled to the one or more processors, a display device coupled to the one or more processors and a communications routine stored on memory that executes on one of the one or more processors to obtain, via the communications network interface, vector data having a plurality of vertex data points, each vertex data point including location information. Moreover, the image rendering engine includes a routine stored on the memory that executes on one of the one or more processors to determine an attribute reference pointer variable value for each vertex data point, a first lookup table stored in the one or more memories having an attribute reference value stored for each of a set of different values of the attribute reference pointer variable and a second lookup table stored in the one or more memories having a set of vertex attribute values for each of a plurality of attribute reference values, wherein the set of vertex attribute values for each of the plurality of attribute reference values includes a value for each of a multiplicity of different vertex attributes. An image shader routine stored in the one or more memories executes on one of the one or more processors to use the first and the second lookup table to determine vertex attribute values for each of the multiplicity of attribute values of the received vertex data points based on the attribute references of the vertex data points. The image shader routine uses the vertex location information and the vertex attribute values for each of the received vertex data points to produce image shader outputs. Moreover, a rasterizer renders an image on the display device using the image shader outputs.

In another embodiment, an imaging system to be used with a processor includes a first routine stored on a computer-readable memory that, when executed on the processor, (1) obtains vector data via a communications network, the vector data having a set of vertex data points, each vertex data point including location information data and an attribute reference pointer variable value, (2) obtains a first lookup table, the first lookup table having an attribute reference value stored for each of a set of different values of the attribute reference pointer variable, and (3) obtains a second lookup table, the second lookup table having a set of vertex attribute values for each of a plurality of attribute references, wherein the set of vertex attribute values for each of the plurality of attribute references includes a value for each of a multiplicity of different vertex attributes. An image shader routine stored on the memory executes on the processor to use the first and the second lookup tables to determine values for each of the multiplicity of attribute values of one or more of the vertex data points based on the attribute reference pointer variable values of the one or more vertex data points and produces image shader outputs based on the location information data and the vertex attribute values of the vertex data points. A processing device processes the image shader outputs to render an image on a display device based on the received vector data.

In still another embodiment, an image shader for use in an imaging system having a processor and a rasterizer includes a first data access routine stored on a memory that, when executed on the processor, accesses vector data, the vector data having a set of vertex data points, each vertex data point including location information data and an attribute reference pointer variable value. The image shader also includes a second data access routine stored on a memory that, when executed on the processor, accesses a first lookup table having an attribute reference value stored for each of a set of different values of the attribute reference pointer variable to determine a particular attribute reference value for a vertex data point, and that accesses a second lookup table having a set of vertex attribute values for each of a plurality of attribute reference values, wherein the set of vertex attribute values for each of the attribute reference values includes a value for each of a multiplicity of different vertex attributes. The image shader uses the first and second lookup tables to obtain a particular set of vertex attribute values associated with the vertex data point. One or more image shader processing routines then process the location information data and the vertex attribute values for each of the vertex data points to produce image shader outputs that are adapted to be used by the rasterizer to render an image on an image display device.

In yet another embodiment, a map image rendering system includes a map storage that stores map-related vector image data, the vector image data including a plurality of vertex points, each vertex point including location data specifying a location of a vertex in a virtual space and an attribute reference pointer variable value. A map image rendering device is communicatively coupled to the map storage to receive the map-related vector image data and to render a map image using the map-related vector image data. The map image rendering device includes a communications network interface, a processor, a memory coupled to the processor, a display device coupled to the processor, and a communications routine stored on the memory that executes on the processor to receive, via the communications network interface, vector data having a plurality of map vertex data points, each map vertex data point including location information data. If desired, the attribute reference pointer variable values may also be obtained via the communications network or may be obtained directly from the map storage if the map storage is within the map image rendering device. Moreover, an attribute reference pointer determination routine determines an attribute reference pointer variable value for each of the vertex data points, a first lookup table decoding routine executes on the processor to access a first lookup table having an attribute reference value stored for each of a set of different values of the attribute reference pointer variable values to determine a particular attribute reference value for a vertex data point and a second lookup table decoding routine executes on the processor to access a second lookup table having a set of vertex attribute values for each of a plurality of attribute reference values, wherein the set of vertex attribute values for each of the plurality of attribute references includes a value for each of a multiplicity of different vertex attributes. The second lookup table decoding routine determines a set of vertex attribute values for each vertex data point based on the attribute reference value for each vertex data point. Still further, an image shader routine stored on the memory executes on the processor and uses the vertex location information and the vertex attribute values for each of the received map vertex data points to produce image shader outputs. A rasterizer renders the map image on the display device using the image shader outputs.

DETAILED DESCRIPTION

A graphics or image rendering system, such as a map image rendering system, receives image data from an image database, such as a map database, in the form of vector data that defines various image objects to be displayed in an image. More particularly, the vector data defines image objects using one or more lookup tables and sets of vertex data points defining image objects, with each vertex data point including position or location data as well as an attribute reference pointer variable value that ultimately points to vertex attribute data values stored in the lookup tables. The attribute reference for a particular vertex data point is used by an image shader, such as a vertex shader or a fragment shader, to determine specific values for one or more vertex attributes of the particular vertex data point, as stored in one of the lookup tables. The image rendering system thus processes the vector data in a manner that allows for minimal data to be sent to the image rendering device from the image database or other application creating this image, as this system enables multiple vertex attribute properties to be specified by a single attribute reference pointer variable value associated with each vertex data point. Moreover, this system enables re-rendering of the image at the image rendering device to change certain look and feel properties of the image objects, such as colors, line widths, etc., by simply downloading or otherwise creating a new lookup table with changed vertex attribute values or with changed attribute reference pointer variable values, and then resubmitting or reusing the originally received vertex data points with the original attribute reference pointer variable values to the image shader, and using the new lookup table(s) to re-render the image. In this case, the image rendering device merely needs to receive the new lookup table data to re-render the image with changed properties, and does not need to receive additional or updated vertex data points from the image database. As a result, this system enables manipulation of the look and feel properties of the image at the image rendering device without a download of a significant amount of additional vector data.

Figure 1:
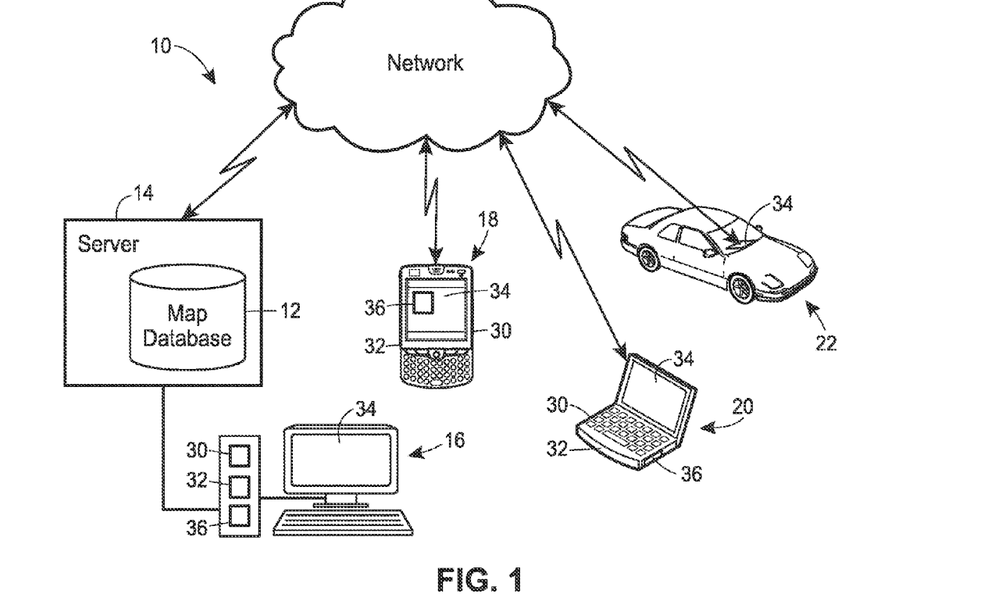
FIG. 1 is a high-level block diagram of a map imaging system that implements communications between a map database stored in a server and one or more map image rendering devices.

Referring now to FIG. 1, a map-related imaging system 10 includes a map database 12 stored in a server 14 or in multiple servers located at, for example, a central site or at various different spaced apart sites, and also includes multiple map client devices 16, 18, 20, and 22, each of which stores and implements a map rendering device or a map rendering engine. The map client devices 16-22 may be connected to the server 14 via any hardwired or wireless communication network 25, including for example a hardwired or wireless LAN, MAN or WAN, the Internet, or any combination thereof. The map client devices 16-22 may be, for example, mobile phone devices (18), computers such a laptop, desktop or other types of computers (16, 20) or components of other imaging systems such components of automobile navigation systems (22), etc. Moreover, the client devices 16-22 may be communicatively connected to the server 14 via any suitable communication system, such as any publicly available or privately owned communication network, including those that use hardwired based communication structure, such as telephone and cable hardware, and/or wireless communication structure, such as wireless communication networks, including for example, wireless LANs and WANs, satellite and cellular phone communication systems, etc.

The map database 12 may store any desired types or kinds of map data including raster image map data and vector image map data. However, the image rendering systems described herein are best suited for use with vector image data which defines or includes a series of vertices or vertex data points for each of numerous sets of image objects, elements or primitives within an image to be displayed. Generally speaking, each of the image objects defined by the vector data will have a plurality of vertices associated therewith and these vertices will be used to display a map related image object to a user via one or more of the client devices 16-22. As will also be understood, each of the client devices 16-22 includes an image rendering engine having one or more processors 30, one or more memories 32, a display device 34, and in many cases a rasterizer or graphics card 36 which are generally programmed and interconnected in known manners to implement or to render graphics (images) on the associated display device 34. The display device 34 for any particular client device 16-22 may be any type of electronic display device such as a liquid crystal display (LCD), a light emitting diode (LED) display, a plasma display, a cathode ray tube (CRT) display, or any other type of known or suitable electronic display.

Generally, speaking, the map-related imaging system 10 of FIG. 1 operates such that a user, at one of the client devices 16-22, opens or executes a map application (not shown in FIG. 1) that operates to communicate with and obtain map information or map related data from the map database 12 via the server 14, and that then displays or renders a map image based on the received map data. The map application may allow the user to view different geographical portions of the map data stored in the map database 12, to zoom in or zoom out on a particular geographical location, to rotate, spin or change the two-dimensional or three-dimensional viewing angle of the map being displayed, etc. More particularly, when rendering a map image on a display device or a display screen 34 using the system described below, each of the client devices 16-22 downloads map data in the form of vector data from the map database 12 and processes that vector data using one or more image shaders to render an image on the associated display device 34.

Figure 2:
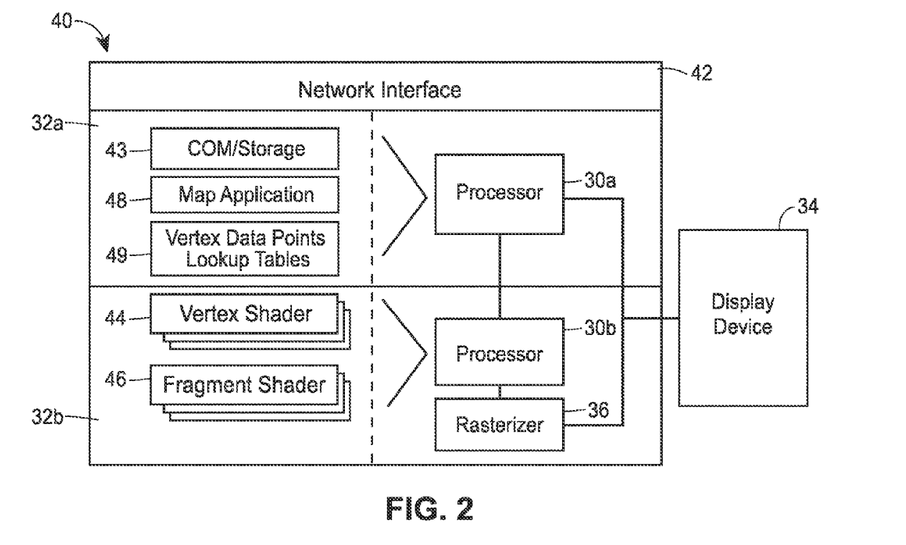
FIG. 2 is a high level block diagram of an image rendering engine used to render map images using map vector data.

Referring now to FIG. 2, an image generation or imaging rendering device 40 associated with or implemented by one of the client devices 16-22 is illustrated in more detail. The image rendering system 40 of FIG. 2 includes two processors 30*a* and 30*b*, two memories 32*a* and 32*b*, a user interface 34 and a rasterizer 36. In this case, the processor 30*b*, the memory 32*b* and the rasterizer 36 are disposed on a separate graphics card (denoted below the horizontal line), although this need not be the case in all embodiments. For example, in other embodiments, a single processor may be used instead. In addition, the image rendering system 40 includes a network interface 42, a communications and storage routine 43 and one or more map applications 48 having map display logic therein stored on the memory 32*a*, which may be executed on the processor 30*a*. Likewise one or more image shaders in the form of, for example, vertex shaders 44 and fragment shaders 46 are stored on the memory 32*b* and are executed on the processor 30*b*. The memories 32*a* and 32*b* may include either or both volatile and non-volatile memory and the routines and shaders are executed on the processors 30*a* and 30*b* to provide the functionality described below. The network interface 42 includes any well known software and/or hardware components that operate to communicate with, for example, the server 14 of FIG. 1 via a hardwired or wireless communications network to obtain image data in the form of vector data for use in creating an image display on the user interface or display device 34. The image rendering device 40 also includes a data memory 49, which may be a buffer or volatile memory for example, that stores vector data received from the map database 12, the vector data including any number of vertex data points and one or more lookup tables as will be described in more detail.

During operation, the map logic of the map application 48 executes on the processor 30 to determine the particular image data needed for display to a user via the display device 34 using, for example, user input, GPS signals, prestored logic or programming, etc. The display or map logic of the application 48 interacts with the map database 12, using the communications routine 43, by communicating with the server 14 through the network interface 42 to obtain map data, preferably in the form of vector data or compressed vector data from the map database 12. This vector data is returned via the network interface 42 and may be decompressed and stored in the data memory 49 by the routine 43. In particular, the data downloaded from the map database 12 may be a compact, structured, or otherwise optimized version of the ultimate vector data to be used, and the map application 48 may operate to transform the downloaded vector data into specific vertex data points using the processor 30*a*. In one embodiment, the image data sent from the server 14 includes vector data generally defining data for each of a set of vertices associated with a number of different image elements or image objects to be displayed on the screen 34 and possibly one or more lookup tables which will be described in more detail below. If desired, the lookup tables may be sent in, or may be decoded to be in, or may be generated by the map application 48 to be in the form of texture maps which are known types of data typically defining a particular texture or color field (pixel values) to be displayed as part of an image created using vector graphics. More particularly, the vector data for each image element or image object may include multiple vertices associated with one or more triangles making up the particular element or object of an image. Each such triangle includes three vertices (defined by vertex data points) and each vertex data point has vertex data associated therewith. In one embodiment, each vertex data point includes vertex location data defining a two-dimensional or a three-dimensional position or location of the vertex in a reference or virtual space, as well as an attribute reference. Each vertex data point may additionally include other information, such as an object type identifier that identifies the type of image object with which the vertex data point is associated. The attribute reference, referred to herein as a style reference or as a feature reference, references or points to a location or a set of locations in one or more of the lookup tables created or downloaded and stored in the data memory 49.

Figure 3A:
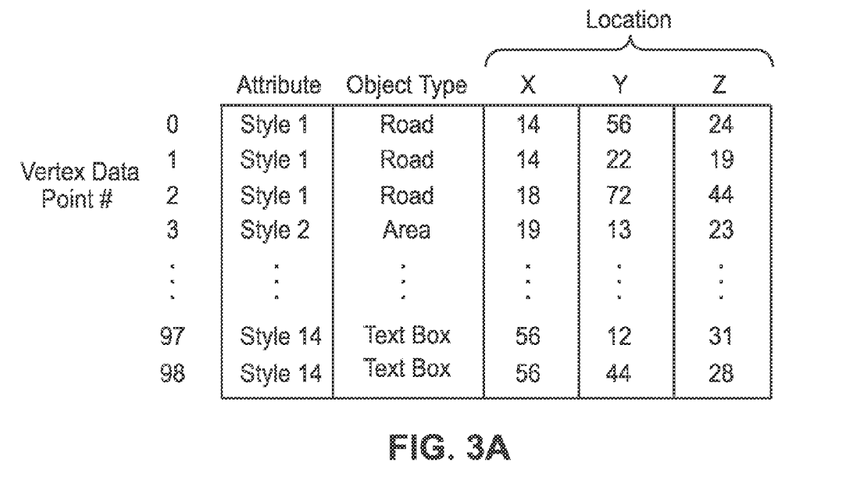
FIG. 3A is a data diagram illustrating a set of vector data in the form of vertex data points encoded using a vertex attribute reference.

FIG. 3A illustrates an exemplary set of vertex data points that may be, for example, downloaded or obtained from the map database 12 or that may be generated by the map application 48 and stored in the memory 49 for an image object prior to being processed by the rendering system 40 and being used to create an image containing the image object on the display device 34. As illustrated in FIG. 3A, the vector data for an image object may include a data set for each vertex of the image object, with the example image object of FIG. 3A having 99 vertex data points (numbered 0-98). In this case, each vertex data point includes two location values (defined in the columns labeled X, Y) and a depth value (defined in the column Z) wherein each location value indicates a value or position of the associated vector data point in one of two coordinate axes of a virtual or reference two-dimensional space (e.g., an X, Y coordinate system). The depth value indicates a depth of the vertex with respect to other image objects in the virtual coordinate space.

As illustrated in FIG. 3A, each vertex data point also includes an object type property (in the second column of FIG. 3A) and an attribute reference (in the first column of the table of FIG. 3A). The object type property defines the type of image object to which the vertex data point pertains and may be used to select the appropriate image shader to use to process the vertex data when rendering an image on a display screen. Of course, any different numbers and types of image objects may be used and the numbers and types of image objects used in any particular image rendering system will be determined by the type of image being rendered. As one example only, vector map images may have image objects in the form of road objects, text objects, area objects, text box objects, and arrow objects, to name but a few. However, other types and kinds of image objects could be used in map images and in other types of images, such as three-dimensional images and the system described herein is not limited to the image objects described above.

The attribute references of the vertex data points in FIG. 3A are, in this case, style attribute references or style references. Each style reference indicates one of a number of predetermined styles associated with the vertex data points. All of the vertex data points for a particular image object may be associated with the same style reference or, alternately, different vertex data points of a particular image object may be associated with different style references (also referred to as style numbers). Of course, different image objects may be sent having vertex data points that reference the same or different style numbers as those referenced in the vertex data points for other image objects. That is, vertex data for the same image objects may reference the same or different style numbers and vertex data for different image objects may use the same set of style numbers so that, in some cases, the vertex data points for different image objects reference the same style number. If desired, the style references may be assigned at the server 12 or may be assigned or generated by the map application 48 based on logic therein generally dependent on user interactions with the map application 48.

Figure 3B:
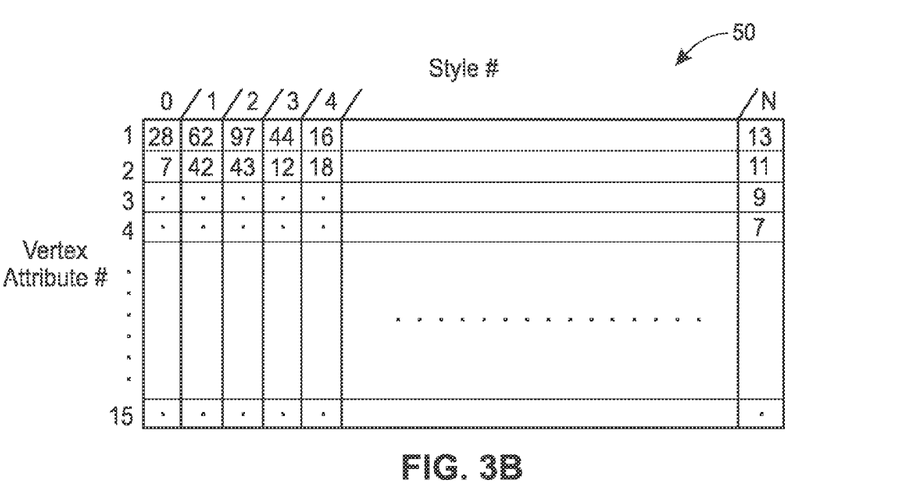
FIG. 3B is a first texture map in the form of a style lookup table that defines vertex attributes values for each of a number of different styles and which is used in the image rendering engine of FIG. 2 to resolve vertex attributes based on a style reference.

FIG. 3B illustrates an example lookup table 50 that may be used to resolve the style attribute references or style references sent or associated with the vector data for one or more image objects. In particular, as illustrated in FIG. 3B, the lookup table 50 includes a set of rows and columns, with each row defining or associated with a different vertex data point attribute and each column defining a different style number. In this case, the vertex attributes provided in the lookup table 50 may include, for example, a fill color (e.g., for area objects), an outline color, an outline width, an outline dashing pattern and an indication of whether to use rounded end caps (e.g., for road objects), an interior color, an interior width, an interior dashing pattern, and interior rounded end caps (e.g., for road objects), a text color and a text outline color (e.g., for text objects), an arrow color, an arrow width, an arrow dashing pattern (e.g., for arrow objects), a text box fill color and a set of text box outline properties (e.g., for text box objects) to name but a few. Of course, different ones of the vertex attributes provided for each style number may be applicable or relevant to only a subset of image objects and thus the vertex data points associated with a particular type of image object may only refer to a subset of the vertex attributes listed for each style.

In any event, each style reference (defined by any particular column of the lookup table 50) includes a particular value for each of the vertex attributes. Any number of different style references may be defined and any number of different vertex attributes may be stored or provided for each style number in the lookup table 50. Generally speaking, however, a value for each of the possible vertex attributes will be stored for each style number. Of course, the data values actually stored within the lookup table 50 indicate the value of a particular vertex attribute (as defined by a row) for a particular style number (as defined by a particular column) of a vertex data point that references that style number.

In one embodiment, the lookup table 50 may be downloaded or otherwise generated (e.g., by the map application 48) and may be stored as a texture or a texture map (also referred to herein as a texture). Generally speaking, textures are used in vector based imaging systems to define a particular field of pixel values to be displayed at a location or at a field within an image being rendered. In the past, textures were used in fragment shaders to define pixel colors on a one to one basis, and have not been used as lookup tables for other attributes of vector data points. Thus, as will be understood, the encoding technique described herein basically takes vertex attribute properties that would normally be sent through the communications network to and stored in data memory within the image rendering engine 40 or that would be sent from the processor 30*a* (running the map application 48) to the processor 30*b* (running the shaders) as raw data values, and instead encodes these vertex attribute values as colors in a texture map. The texture map is then sent to the processor 30*b* of the image rendering engine 40 and is used as a lookup table to define vertex attribute values for different vertex data points based on an attribute reference sent with each of the vertex data points. This encoding technique can be advantageously used when the same combinations of vertex attribute values are repeated for multiple sets of vertices, either for the same image object or for different image objects. For example, all vertices in a particular image object may share a color and other material properties such as line width, fill properties, etc., and this set of vertex attribute values will be sent as a style within the lookup table 50 and be decoded in a vertex shader 44 or a fragment shader 46 based on an attribute reference sent with each of the vertex data points of the image object, the attribute reference pointing to the vertex attributes of a particular style as stored in the texture map. This encoding technique generally reduces the amount of data that needs to be sent through the communications network or between the processors 30A and 30*b* and stored within the graphics card of the image rendering engine.

In one example, a texture may be encoded with vertex attribute values using a single column of the texture for each unique set of vertex properties or attribute values (i.e., for each style). Colors can be directly stored in the texture and the values of these colors can be encoded or determined as the values of the corresponding vertex attribute. Floating point values can be encoded into color values of the texture with fixed precision by multiplying the floating point number by different factors for each color component and taking the result modulo 256, where the factors for each component differ by a magnitude of 256. The exact factors used can be based on the expected range of the value. Integers can be encoded into colors in the same manner, but with factors of, for example, 1, $2^8$, $2^{16}$, and $2^{24}$. The texture map can be extended to support more entries than the maximum width of a typical image texture by wrapping onto a second, third, etc. row of properties. The resulting size of the texture should be sent to the image shader which uses the texture map to decode vertex attribute values. Moreover, an encoded texture may be created with nearest pixel minification and magnification filters to prevent interpolation.

Once sent, the coordinates for the vertex properties can be computed in an image shader using the integer index (the style number) passed in as a vertex attribute reference, and the texture size, which can be a uniform variable. The coordinates to use for a particular attribute value will be the index modulo the texture width for X (the texture column dimension), and the floor of the index divided by the texture width for Y (the texture row dimension). The Y value should then be multiplied by the number of pixels it takes to encode one set of properties. The vertex shader 44 can then read the colors corresponding to each vertex attribute from the texture. The inverse of this encoding procedure can be performed to create the texture at, for example, the server 14. The decoded attribute values can then be used as if they were vertex attribute values.

This approach saves memory, in the map database 12, in the data memory 49 of and in the graphics card memory of an image rendering device 40, for images that have vertex attributes that have identical values across multiple vertices. In addition, this approach allows the properties for a single object to be changed by changing a single column of the texture rather than changing each of a set of vertex attributes in different vertex data points. In one example, the map application 48 may initially generate and/or may change the style lookup table to generate new styles or to change styles as stored in the lookup table. The map application 48 may perform style data generation and changes, either partially or completely, using structure data from the map database or data in the client device such as preprogrammed style information, user inputs, etc.

After the vector data, including the vertex data points and the lookup table 50 in the form of, for example, a texture map, are downloaded or otherwise generated and stored in the memory 49, the logic of the map application 48 may implement an image rendering procedure using this data. At some point within this image rendering procedure, one or more of the image shaders 44 and 46 decode the attribute values for one or more of the vertex data points based on the attribute reference of each vertex data point and the attribute values stored for vertex references within the lookup table 50. The image rendering procedure thereafter uses these attribute values to render the image on the display device 34. While it is preferable to perform vertex attribute value decoding within the vertex shaders 44 (as the decoding is then only performed once per vertex data point), it is also possible in some cases to perform the vertex attribute value decoding in the fragment shaders 46 (which generally use the decoded attribute values to render an image.) However, performing vertex attribute value decoding in the fragment shaders 46 generally involves more processing, as the fragment shaders 46 may need to decode a particular vertex data point more than once if that vertex data point is relevant to more than one pixel being rendered by the fragment shaders 46. As a result, in the following discussion, it will be assumed that the vertex attribute value decoding is performed in the vertex shaders 44, although as noted above, this need not be the case in all instances.

At the start of the image rendering process, the downloaded, or otherwise decoded and generated vector data is first provided to one or more of the vertex shaders 44. The vertex shaders 44 process the vector data to produce an output for each input data point, each output indicating the two-dimensional location for each of the vector data points on the display screen 34 along with, in some cases, vertex attributes for those points. As is typical, each vertex shader 44 implements a graphics processing function that may be used to add special effects to objects and generally operates to convert or transform the positions or locations of vertex data points from the virtual or reference space (as stored in the map database 12) to a two-dimensional point for display on an image display screen and a depth value associated with that point (if needed). Of course, the transformation performed by the vertex shader 44 will depend on current imaging factors being used on the display device 34, such as the screen size, the zoom level or magnification, the orientation of the image on the display device 34, etc. A vertex shader 44 is run once for each vertex data point given to the processor 30 and, in the map imaging system being described as an example herein, the purpose of each vertex shader 44 is transform the two-dimensional position of each vertex in the virtual space to the two-dimensional coordinate at which it appears on the screen. The vertex shaders 44 may also use the attribute reference of the vertex data points and the associated texture to determine the values of the vertex attributes for each vertex from the texture or lookup table 50, and the image rendering system 40 then uses these values to manipulate properties such as position, color, and texture coordinates. The outputs of the vertex shaders 44 are provided to the next stage in the graphics pipeline, which in this case is a rasterizer 36.

Of course, there may be various different types of vertex shaders 44 that may operate or execute on different types of image objects. Thus, for example, in a map image context, the vertex shaders 44 may include area shaders (to process area object types and text box objects), road shaders (to process road objects, line meshes, and arrow objects), building shaders (to process building objects which may be three-dimensional objects), and image shaders which use traditional textures to create an image on a display. The vertex shaders 44 may use or be programmed in any of a set of different languages depending on which API is used by the graphics engine or client device 40. While the vertex shaders 44 can be written in various forms of assembly language, they can also use or be programmed using higher-level languages such as DirectX's HLSL and OpenGL's GLSL, along with Cg, which can compile to both OpenGL and DirectX shader instructions. In any event, in one embodiment, the vertex shaders 44 are programmed to convert the attribute reference provided as part of each vertex data point to a plurality of vertex attribute values by obtaining the corresponding vertex attribute values from the texture based lookup table 50 based on the value of the vertex attribute reference. Of course, the vertex shaders 44 will render the vector data based on the viewpoint or view currently associated with the image displayed or being displayed, as determined by the display logic of the map application 48.

Because the vertex shaders 44, when performing vertex attribute value decoding, use the lookup table 50, which may be in the form of the texture map of FIG. 3B, to resolve the vertex attributes associated with each vertex data point, the vector data can be downloaded to the device 40 or may be sent from the processor 30a to the processor 30b such that each vertex data point includes a single attribute reference value, instead of multiple vertex attribute values, one for each of a set of vertex attributes, as would be required by typical imaging systems. The only additional information that needs to be downloaded or sent between processors is the lookup table 50 which can be easily sent as a texture map and which, furthermore, only needs to be sent once and stored in the memory 49 or in the memory of the graphics card. Once sent, the lookup table 50 can be used by the vertex shaders 44 any number of times to thereafter to resolve the attributes for the vector data points for any number of image features. The use of a single attribute reference value in each vertex data point, instead of the use of multiple attribute values for each vertex data point significantly reduces the download bandwidth or time requirements (either between the server 12 and the client device or between the processors 30a and 30b of the client device) in addition to the storage requirements for this data, even though an additional texture map needs to be sent, because a texture map is relatively small in size as compared to the multiple attribute values that would have to sent and stored for each vector vertex data point.

After the vertex shaders 44 have operated on (resolved) each of the downloaded and stored vertex data points, the rasterizer 36 uses the outputs of the vertex shaders 44 to render an image on the display screen 34. During this process, the rasterizer 36 may call or use the fragment shaders 46 which fill in or determine the values of pixels in the image being displayed on the display device 34 by interpolating between the values of the vector attributes as defined by or output by the vertex shader 44 (or as determined in the fragment shaders 46), so as draw lines, outlines and fill in areas of the image being displayed. Of course, the fill colors, line widths, light properties, etc. of the image at each point are defined in some manner by the vertex attribute values output by the vertex shader 44, which in turn are determined using the lookup table 50 of, for example, FIG. 3B.

The fragment shaders 46, also referred to as pixel shaders, perform complex per-pixel effects. The fragment shaders 46 are essentially a computation kernel function that computes color and other attributes of each pixel. The fragment shaders 46 can range from always outputting the same color, to applying a lighting value, to doing bump mapping, shadows, specular highlights, translucency and other phenomena. In some cases, the fragment shaders 46 can alter the depth of a pixel (for z-buffering), or output more than one color if multiple rendering targets are active. However, this is not always the case, such as in OpenGL ES 2.0. Of course, the fragment shaders 46 may use any of a set of different languages depending on which API the graphics rendering engine 40 uses. However, the fragment shaders 46 will typically use the same language used by the vertex shaders 44. As noted above, the fragment shaders 46 can also or instead perform vertex attribute decoding using the attribute reference of each vertex data point and the lookup table 50.

As noted above, downloading or generating the lookup table 50 in the form of a texture map, in a single instance to be stored in the memory 49, enables future vector data sent from the map database 12 or between the processors 30a and 30b including an attribute reference to the lookup table 50 to be more limited in scope. More particularly, using this communication and processing technique requires less bandwidth and/or time as compared to providing each vertex point with values for each of a set of attributes during the communication procedure. This technique also reduces the amount of storage space needed to store vertex data. This technique is very useful when, as typically the case with maps, certain combinations of vertex attributes are shared by many vertices sent as part of the vector data.

Of course, once the attribute lookup table 50 is sent to an image rendering device 40 or is generated within an image rendering device 40 and is stored in the memory 49 thereof, each future set of data sent from the map database 12, which may be sent on a map tile by map tile basis (wherein each map tile is a predetermined amount of data or data covering a predetermined geographical region for a map), can use the same lookup table 50 to resolve vertex attributes. Again, use of the lookup table 50 to decode or resolve vertex attribute values based on a vertex attribute reference sent as part of the data for each vertex data point essentially reduces the amount of data that needs to be sent from the server 14 or that needs to be sent between processors 30a and 30b in further part because the texture map or lookup table 50 does not need to be sent for each map tile but can, instead or in some cases, be sent down or generated once per download. Moreover, once downloaded or generated, the lookup table 50 can be stored in the memory 32 and used for each subsequent downloaded tile to provide consistent styles or a consistent look and feel of the image as rendered on the image display device 34 (i.e., such that roads, labels or other image objects of the same type have the same style or look and feel because the vertices of these image objects use the same vertex attribute values as defined by a particular style in the lookup table 50).

Still further, using this technique, a map image, once downloaded and rendered using a particular style or set of styles, can be easily changed or altered to have a different look and feel or a different set of styles by simply changing the values of the lookup table 50 for the styles defined therein and then re-rendering the image using the original vertex data. This technique allows re-rendering the image to be displayed in a manner that changes the look and feel of the image, such as by changing color properties, line width properties, fill properties, etc. by simply changing the vertex attribute values for a particular style within the lookup table 50 and then re-rendering the image using the new or changed lookup table 50. Importantly, this technique does not necessitate downloading a whole new set of vertex data points from the map database 12 (or regenerating new vertex data points with new attributes within the processor 30a), as the originally downloaded vertex data points can be used to re-render the map image using a new set of style attribute values. At most, this technique only requires downloading or generating a new lookup table or texture map to define the new attribute values for the styles defined therein. Still further, if desired, multiple different lookup tables 50 can be downloaded or generated and stored in the memory 49 of the image rendering device in the first instance, and the logic of the map application 48 can select or determine which lookup table 50 to use based on predetermined logic and/or actions performed by the user (e.g., the zoom level at which the user is viewing the map, highlighting or selections performed by the user, etc.) If, on the other hand, the vertex data was downloaded with actual values for each of the vertex attributes for each vertex point, it would be necessary to download new vertex data points with different attribute values to change the style properties of the image being rendered.

Stated in another manner, using the lookup table 50 to resolve or decode vertex attribute values allows the client device 40 to re-render an image to change certain visual attributes thereof (such as colors, line widths, light properties, etc.) using the originally downloaded vector data. Here, the imaging system only needs to download, generate, use or select a different lookup table 50 defining the styles differently (e.g., changing the values of the attributes associated with a particular style) to re-render the image using the new style. Different styles may be used, for example, to change or alter the manner in which lines are created (colors, widths, etc.) and to change colors or other light attributes of an image. Of course, the styles used to produce an image may be changed by the map application 48 downloading or generating a new lookup table in response to a request for a changed image view, or may be changed by originally providing multiple different predetermined lookup tables to the rendering engine 40 and allowing the logic within the map application 48 to switch between different lookup tables 50 to resolve the vertex attribute data and to re-render the image based on actions of the user or other factors. This image rendering technique enables image styles to be effectively changed with minimal data downloading (either between the server and the client or between the processors 30a and 30b), and thus enables an image such as a map image, to be rerendered using different styles to create a different look and feel of the image, in response to user actions, without a significant amount of data downloading or communication. This technique thereby greatly reduces the amount of data that needs to be sent from the server 14 to the rendering engine 40 or between processors 30a and 30b when simple style changes to the image are needed.

Figure 4:
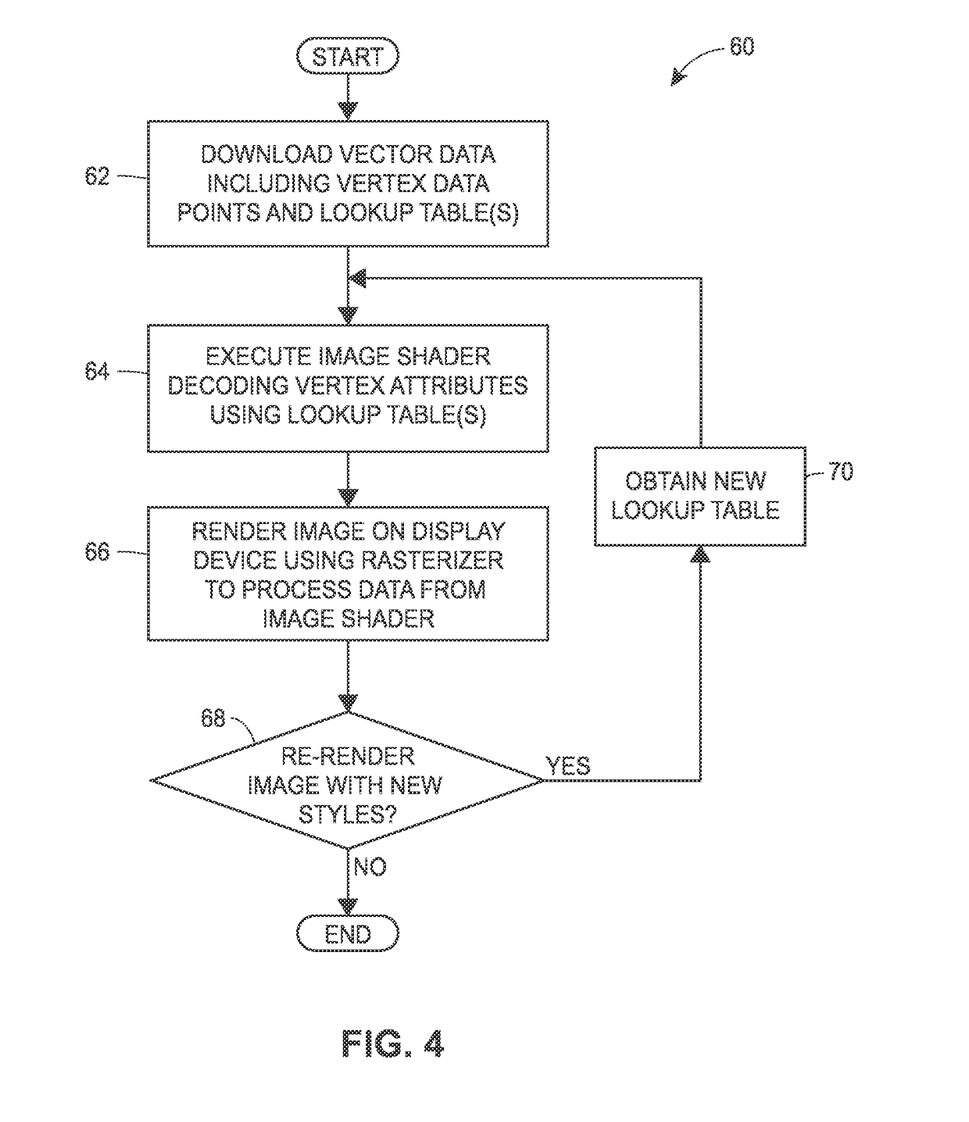
FIG. 4 illustrates an example routine or process flow diagram that uses one or more of the lookup tables of FIGS. 3B and 3C to render map images using the rendering engine of FIG. 2.

FIG. 4 illustrates an example process or routine 60 that may be implemented by a graphics or image rendering engine, such as the rendering engine 40 of FIG. 2 to render an image using the technique described above. In response to, for example, logic within the map application 48 determining that vector data needs to be downloaded from the map database 12 to generate a particular image, a block 62 contacts and downloads vector data from the map database 12 via the network interface 42. This vector data includes vertex data points, wherein each vertex data point includes spatial location values and at least one attribute reference value, and can include one or more lookup tables to be used in resolving the attribute reference values within the vertex data points. Alternatively or in addition, the block 62 can generate lookup tables based on user actions, logic in the device 40, other data from the database 12, etc. The block 62 then stores the downloaded or generated data, including the vector data points and the lookup table(s) in the memory 49 of the image rendering device 40. Of course, the block 62 will use the communications routine 43 of FIG. 2 to communicate via the network interface 42 with the server 14.

Next, a block 64 provides the vertex data and the lookup tables to the processor 30b and executes the vertex shaders 44 of, for example, the image rendering engine 40 FIG. 2. Of course, the particular vertex shaders to be used on each set of vertex data will depend or be determined by the object type of the particular vertex data points. That is, all of the vertex data points of one type (such as all roads, all text boxes, all areas, etc.) may be provided at the same time to a vertex shader that is designed to process those types of vertices and may be processed together (i.e., in one call) within the appropriate vertex shader. While executing, the vertex shaders 44 may decode the vertex attribute values for the vector data points provided thereto, and does so using one of the stored lookup tables, e.g., one of the textures, to resolve or decode the vertex attribute reference provided within each of the vertex data points to determine multiple vertex attribute values for each vertex data point.

More particularly, a particular vertex shader will obtain or use the attribute reference in the form of, for example, a style number to obtain the column within the lookup table 50 to access for each of the vertex attributes provided in the different rows of the lookup table 50. Of course, all of the vertex attribute values for a particular style may not be relevant to every type of image object and the different types of vertex shaders 44 may obtain only a subset of the vertex attribute values stored for each style. The vertex shader 44 also operates in a traditional or typical manner to determine the two-dimensional location of the vertices provided thereto on the display device 34, which locations are provided to the rasterizer 36. At a block 66, the rasterizer 36 renders the image on the display device 34 using the output of the vertex shader 44. In addition, the rasterizer 36 may call the fragment shaders 46 to determine pixel values for each of the pixels for the image being displayed. Essentially, the rasterizer 36 will use the fragment shaders 46 in known manners to produce an image based on the outputs of the vertex shader 44, including the vertex attribute values.

Thereafter, the map image is displayed on the display device 34 and, at a block 68, logic within the map application 48 may next determine whether to re-render the map with new styles at a block 68. As one example, the logic within the map application 48 may determine to re-render the map image using new styles based on one or more user actions indicating changes to be map, such as zooming in or zooming out, highlighting or selecting various features or areas, or for any other reason. Upon determining that it is desirable or necessary to re-render the map with new styles, a block 70 obtains or selects a new lookup table to use to resolve the new styles within, for example, the vertex shader (or changes the values of the current lookup table to alter the values of at least one style). In some cases, this new reference lookup table may be downloaded from the map database 12 via the network interface 42, may be chosen as a different one of a number of lookup tables originally downloaded from the map database 12 and stored in the data memory 49 in the anticipation that the styles might need to be changed in a predetermined or expected manner, may be an altered or changed version of the lookup table, as changed by the logic of the map application 48 or may be generated partially or completely by the map application 48 using other structure data from the map database 12 or data in the client device such as preprogrammed style information or user inputs as examples only. Of course, the attribute values of a particular style number may be changed for any desired reason.

Moreover, the vector data, i.e., the vertex data points may be encoded with the same or different style numbers in any desired manner. For example, all of the vertex points of an image tile may use the same style number, the vertex points of each image object of the same object type may use the same style number or the vertex points of each image object may use different style numbers, to name but a few. Of course, the same style number may be used for vertex points of various different tiles or image objects in different tiles as well. Thus, vertices associated with common types of objects may all use the same style number so that all of the objects of a particular type (primary roads, labels, arterial roads, terrain, etc.), are rendered using the same style and therefore have the same look and feel.

In any event, once the block 70 determines the new style attribute lookup table to use either as stored in memory 49 or as obtained from the map database 12, the block 64 then re-executes the vertex shaders 44, which then resolve or decode the vertex attributes using the new lookup table and which thus causes the block 66 to re-render the image using the new vertex attribute values for the changed style. Of course, this process can be repeated any number of times based on user actions or other inputs to the logic of the map application 48.

As an enhancement to the encoding/decoding and rendering technique described herein, it is possible to provide more flexibility in changing styles and in further reducing downloaded or communicated data by using a two-tiered lookup table to determine attribute values for vertex data points. In particular, the use of a two-tiered lookup table enables styles to be changed on a feature by feature basis to thereby be able to change the look and feel of some features (referencing a particular set of style attributes) without changing the look and feel of other features (which may originally have referenced the same set of style attributes). In this context, a feature may be a grouping of a number of different image objects (either of the same type or of different types). For example, all arterial roads, or all secondary streets, or all labels or all text boxes within a map tile may be defined as a common feature. In this case, each of the image objects of the feature are of the same object type. As another example, a university campus may be defined as a feature, and this campus may include image objects of various different types. For example, this feature may include various building objects, may include various roads or paths traversing the campus, may include text boxes or area boxes associated with the campus. These image objects of different types may be grouped together as a common feature.

Figure 3C:
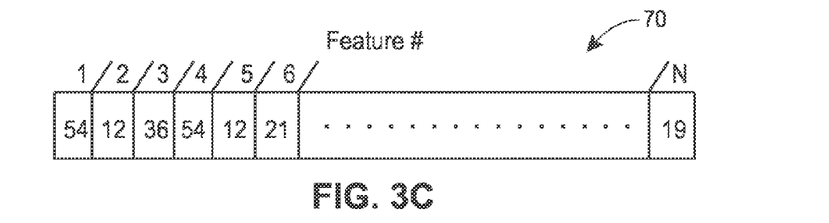
FIG. 3C is a second texture map in the form of a feature lookup table that defines a style reference associated with each of a number of different feature references and which is used within the image rendering engine of FIG. 2 to resolve vertex point attribute values for vertex data points based on both a feature reference and a style reference.

In this case, in addition to using a style attribute lookup table 50, the system also uses a feature lookup table such as the lookup table 70 of FIG. 3C. More particularly, the additional feature lookup table 70 is a single row of values with multiple columns, in which each column is associated with a different feature number and the value within the row indicates a style number for the associated feature number. The style number refers to one of the style references or columns in the lookup table 50 of FIG. 3B. Using this two-tiered lookup table technique, the vertex data downloaded from the map database 12 or generated by the map application 48 will, instead of having an attribute reference in the form of a style reference, will have an attribute reference that refers to a particular feature number (referred to herein as a feature reference) defining the feature number in the lookup table 70 with which the vertex data point is associated. Thus, vertex data points associated with different features will have different feature numbers even though they are associated with or may be within the same map tile or may be associated with a common image object type.

As will be understood, the feature lookup table 70 may also be encoded as a texture map (albeit of a single row) and may be download from the map database 12 or generated within the client device 40, in addition to the style lookup table 50 that defines the values of each of the set of styles to be used for different features. In this case, the vertex shaders 44 (or other shaders that perform the vertex attribute decoding function), when decoding each vertex data point, will access the texture map 70 using the feature reference sent or stored with a particular vertex data point to obtain a style number currently associated with that feature. The vertex shaders 44 (or other shaders as appropriate) will then use the style number as a style attribute reference to decode or determine the vertex attribute values for each of the data points based on that style number as stored in the lookup table 50 of FIG. 3B.

Of course, the rendering engine 40 can download and/or generate a predetermined or fixed style reference lookup table, such as the table 50, once and use that style reference lookup table in all future operations. That is, the style reference lookup table 50 may, in this case, define styles in a fixed manner to be used thereafter when rendering an image. However, the style used to render particular image objects may be changed by making changes to the feature texture map 70.

In fact, using this two-tiered lookup table decoding technique, it is easy to change the style attribute values used for a particular image object or set of image objects that are associated with a particular feature (i.e., all vertex data points which refer to the same feature number) by simply changing the style number associated with that feature in the feature reference lookup table 70. In other words, changing the style number stored for a particular feature number in the table 70 will change the attribute values for each vertex data point that references that feature number to the values associated with the new style number, as stored in the style lookup table 50. In this case, it is easy to change the look and feel of individual features within the map without changing the look and feel of other features, even if these different features include different types of image objects. Of course, the map application 48 may perform these actions based on logic stored therein using data from the map database 12 and/or user input.

Changing the look and feel of the displayed image on a feature by feature basis may be desirable when, for example, a user wishes to highlight or view common types of image elements, such as all arterial roads, within a displayed image or when a user wishes to highlight or change properties of a logical group of different types of image objects, such as all image objects associated with a university campus. To do so, the user merely needs to highlight or select an element within an area or group of objects that he or she wishes to highlight, and specify one of the image objects of the feature type that the user wishes to highlight. The map application 48 may then determine the feature number of the selected image object and change the style number associated with that feature number (within the texture map 70) to a different style number that, for example, changes the color of the feature, to thereby highlight all of the image objects of that feature or all image elements encoded using that same feature number. Of course, as indicated for the style lookup table 50, new feature lookup tables 70 may be downloaded from the database 12 in response to user actions, may be downloaded as one of the series of different lookup tables at an initial download or may be changed by the logic within the map application 48 to alter styles on a feature by feature basis. In any event, this use of the feature lookup table 70 of FIG. 3C, while enhancing the flexibility of the imaging system by enabling the imaging system to alter the look and feel of a displayed image on a feature by feature basis, also reduces the amount of downloading or communicating data between the processors 30a and 30b. In particular, the only downloading or inter-processor communication that needs to be performed to change the look and feel of an image already displayed is the downloading of a new or altered feature lookup table, which is relatively small in nature and is typically smaller than the style lookup table 50.

Figure 5:
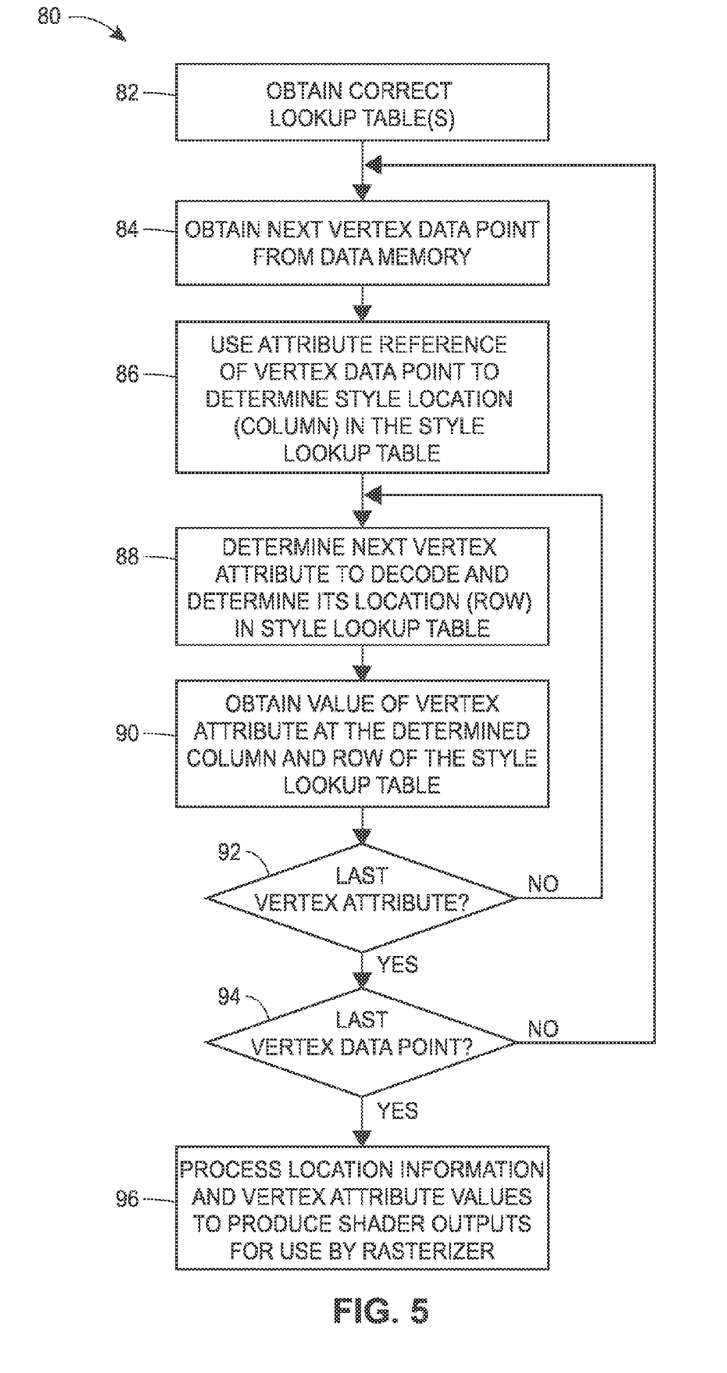
FIG. 5 illustrates an example routine or process flow diagram of an image shader that uses one or more of the lookup tables of FIGS. 3B and 3C to process vertex data points having either a style attribute reference or a feature attribute reference.

Referring now to FIG. 5, an example process or routine 80 that may be implemented by one of the image shaders, such as one of the vertex shaders 44 or one of the fragment shaders 46, to decode the vertex attribute values using the style lookup table 50 alone or in combination with the reference lookup table 70 is described in more detail. In particular, the image shader, which may be for example a particular one of the vertex shaders 44, first obtains the appropriate style lookup table 50 and, if needed the appropriate feature lookup table 70, as stored in the data memory 49 (which may additionally be provided on the graphics card if so desired). As noted above, the particular lookup tables to use may change or vary from time to time based on input from the map application 48, new downloads, etc.

Next, at a block 84, the image shader obtains the next vertex data point to be processed from the data memory 49 or other graphics card memory. Prior to beginning the routine 80, the vertex data points received from the map database 12 may be categorized or segregated into lists of vertex data points associated with different object types or shader types, so that the vertex data points to be processed by a particular image shader, such as a particular vertex shader, are predefined or are located together. If this presorting has not been completed, the block 84 may determine whether the next obtained vertex data point is of the appropriate object type for this particular image shader and, if not, may discard that vertex data point and obtain the next vertex data point, until the block 84 locates a vertex data point having the correct object type for processing by this image shader.

After the next appropriate vertex data point has been retrieved, a block 86 obtains the value of attribute reference of the obtained vertex data point to determine the style reference number to be used to decode the vertex attribute values to be used for this vertex data point. In the case in which the attribute reference of the vertex data point is a style reference, the value of the attribute reference of the vertex data point determines or identifies the appropriate style column in the lookup table 50 and thus the appropriate X value for use for obtaining the vertex attribute value from the two-dimensional lookup table 50 (which in this case may be a texture). If, on the other hand, the two-tiered decoding method described above is used, then the attribute reference of the vertex data point will be a feature reference and the block 86 uses the value of this feature reference to determine the specific style reference number to use from lookup table 70 (which again may be a texture). In particular, the feature reference of the vertex data point determines the X location in the single row of the lookup table 70, and this value can be multiplied by the size of each memory location within the lookup table 70 to determine the exact memory location in the lookup table 70 from which to obtain the style reference number. Thereafter, the block 86 uses the obtained style reference number to determine the appropriate column of the lookup table 50 from which to determine vertex attribute values for the vertex data point being processed.

At a block 88, the image shader determines the next vertex attribute to decode. In particular, while a vertex attribute value will generally be stored for all of the possible vertex attributes for each style number, a particular vertex data point may not need or use all of the different vertex attributes stored for each style number. In other words, the attribute values that are relevant to the vertex data point being decoded may be and usually are a subset of (that is less than) the total number of attribute values stored for each style number. As an example, if the image shader is a vertex shader associated with processing road object types, the vertex shader (and the fragment shader) will not use vertex attributes that define arrow head properties or text properties, for example. As a result, the image shader will know, beforehand, which particular vertex attributes it needs and the relative location (e.g. the row) of these vertex attributes within the style lookup table 50. After the block 88 determines the appropriate row of the vertex attribute value being determined, a block 90 obtains the vertex attribute value for the particular vertex attribute from the lookup table 50 based on the determined column and row locations of the vertex attribute value. Of course, this procedure may involve making a texture call to read data or values from the lookup table 50 as a texture map.

Next, a block 92 determines whether the last vertex attribute for this particular type of vector data point has been decoded and if not, returns controls back to the block 88 to determine the next vertex attribute value to decode for this vertex data point. When all of the vertex attribute values have been decoded for the particular vertex data point being processed, a block 94 determines whether the last vertex data point within the data memory 49 for processing by this image shader has been analyzed, and if not, returns control to the block 84 which obtains the next vertex data point from the data memory 49 for processing.

When the block 94 determines that all of the appropriate vertex data points have been analyzed and decoded to determine all of the needed vertex attribute values associated therewith, a block 96 processes the location information within the vertex data points as well as the decoded vertex attribute values for the complete set of vertex data points to produce image shader outputs. If the image shader is a vertex shader, the image shader outputs may include two-dimensional location points (and a z-depth if desired) as well as values for appropriate vertex data point attributes, and these outputs are provided to the rasterizer 36 for processing. Of course, some or all of the vertex attribute values for vertex data points might be used in the fragment shaders 46 to render an image based on those decoded vertex attribute values. If, on the other hand, the routine 80 is implemented in one of the fragment shaders 46, fragment shader may use the decoded attribute values as well as the location of the vertex data point provided from the rasterizer 36 to pixelate or otherwise render an image on the display screen 34 using the rasterizer 36. Of course, in this case, the outputs of the fragment shaders 46 are provided to the rasterizer 36 to be rendered on the image display device 34.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

For example, the network 25 may include but is not limited to any combination of a LAN, a MAN, a WAN, a mobile, a wired or wireless network, a private network, or a virtual private network. Moreover, while only four client devices are illustrated in FIG. 1 to simplify and clarify the description, it is understood that any number of client computers or display devices are supported and can be in communication with the server 14.

Additionally, certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term hardware should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware and software modules can provide information to, and receive information from, other hardware and/or software modules. Accordingly, the described hardware modules may be regarded as being communicatively coupled. Where multiple of such hardware or software modules exist contemporaneously, communications may be achieved through signal transmission (e.g., over appropriate circuits and buses) that connect the hardware or software modules. In embodiments in which multiple hardware modules or software are configured or instantiated at different times, communications between such hardware or software modules may be achieved, for example, through the storage and retrieval of information in memory structures to which the multiple hardware or software modules have access. For example, one hardware or software module may perform an operation and store the output of that operation in a memory device to which it is communicatively coupled. A further hardware or software module may then, at a later time, access the memory device to retrieve and process the stored output. Hardware and software modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" or a "routine" is a self-consistent sequence of operations or similar processing leading to a desired result. In this context, algorithms, routines and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, nonvolatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description should be read to include one or at least one and the singular also includes the plural unless it is obvious that it is meant otherwise.

Still further, the figures depict preferred embodiments of a map rendering system for purposes of illustration only. One skilled in the art will readily recognize from the following discussion that alternative embodiments of the structures and methods illustrated herein may be employed without departing from the principles described herein Upon reading this disclosure, those of skill in the art will appreciate still additional alternative structural and functional designs for a system and a process for rendering map or other types of images through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A computer-implemented method for rendering an image on a display device, comprising:
   obtaining at a computer device vector data having a set of vertex data points, each vertex data point including location information data and a value for an attribute reference pointer variable;
   storing at the computer device a first lookup table having an attribute reference value stored for each of a set of different values of the attribute reference pointer variable, wherein the attribute reference value corresponds to a predetermined style for rendering a portion of the image relating to one or more of the vertex data points;
   storing at the computer device a second lookup table comprising a two dimensional texture map encoding a set of predetermined styles indexed along one of the two dimensions of the texture map, wherein each predetermined style includes an encoded data value corresponding to a vertex attribute value for each of a plurality of different types of style attributes indexed along the other of the two dimensions of the texture map, and wherein each of the plurality of different types of style attributes corresponds to one of a plurality of distinct aspects of rendering portions of the image;
   executing an image shader on the computer device to use the first and second lookup tables to determine the vertex attribute values associated with the predetermined style corresponding to each of the set of vertex data points based on the value for the attribute reference pointer variable of the vertex data point and to produce image shader outputs based on the location information data and the vertex attribute values of each of the set of vertex data points; and
   processing each of the image shader outputs to render an image on the display device based on the received vector data.

2. The computer-implemented method of claim 1, wherein obtaining the vertex data points includes downloading the vertex data points from an image database via an electronic communications network.

3. The computer-implemented method of claim 1, wherein obtaining the vertex data points includes downloading the vertex data points from an image database via an electronic communications network without the attribute reference pointer variable values and associating a value for the attribute reference pointer variable for the vertex data points at the computer device.

4. The computer-implemented method of claim 1, wherein storing the first lookup table and storing the second lookup table includes receiving, via the electronic communications network, one of the first lookup table and the second lookup table from a server connected to the image database and generating the other one of the first lookup table and the second lookup table at the computer device.

5. The computer-implemented method of claim 1, wherein storing the first lookup table and storing the second lookup table includes generating both of the first lookup table and the second lookup table at the computer device.

6. The computer-implemented method of claim 1, wherein each vertex data point includes location information data in the form of two-dimensional coordinate values specifying a two-dimensional location of a vertex in a virtual two-dimensional space.

7. The computer-implemented method of claim 1, wherein the plurality of different types of style attributes includes one or more of a color, a fill pattern, and a line width.

8. The computer-implemented method of claim 1, wherein processing each of the image shader outputs includes using a fragment shader to render the image on the display device.

9. The computer-implemented method of claim 1, wherein the attribute reference value includes an integer index associated with one of the predetermined styles and the two dimensional texture map encodes the vertex attribute values using the integer index and the width of the two dimensional texture map.

10. An image rendering engine, comprising;
    a communications network interface;
    one or more processors;
    one or more memories coupled to the one or more processors;
    a display device coupled to the one or more processors;
    a communications routine stored on memory that executes on one of the one or more processors to obtain, via the communications network interface, vector data having a plurality of vertex data points, each vertex data point including location information;

a routine stored on the memory that executes on one of the one or more processors to determine an attribute reference pointer variable value for each vertex data point;

a first lookup table stored in the one or more memories having an attribute reference value stored for each of a set of different values of the attribute reference pointer variable, wherein the attribute reference value corresponds to a predetermined style for rendering a portion of an image on the display device relating to one or more of the vertex data points;

a second lookup table stored in the one or more memories comprising a two dimensional texture map encoding a set of predetermined styles indexed along one of the two dimensions of the texture map, wherein each predetermined style includes an encoded data value corresponding to a vertex attribute value for each of a plurality of different types of style attributes indexed along the other of the two dimensions of the texture map, and wherein each of the plurality of different types of style attributes corresponds to one of a plurality of distinct aspects of rendering portions of the image;

an image shader routine stored in the one or more memories, which when executed on one of the one or more processors, uses the first and the second lookup table to determine vertex attribute values associated with the predetermined style corresponding to each of the set of based on the attribute references of the vertex data points and uses the vertex location information and the vertex attribute values for each of the received vertex data points to produce image shader outputs; and a rasterizer that renders the image on the display device using the image shader outputs.

11. The image rendering engine of claim 10, further including an image application stored in the memory that executes on the processor to obtain image data using the communications routine and executes on the processor to render the image using the image shader and the rasterizer.

12. The image rendering engine of claim 11, wherein the image application obtains one of the first and the second lookup tables by receiving the one of the first and the second lookup tables via the communications network interface from a server communicatively connected to an image database.

13. The image rendering engine of claim 11, wherein the image application obtains one of the first and the second lookup tables by generating the one of the first and the second lookup tables.

14. The image rendering engine of claim 11, wherein the image application obtains vector data in the form of map image data using the network communications routine and uses the image shader and the rasterizer to render a map image on the display device.

15. The image rendering engine of claim 10, wherein the plurality of different types of style attributes of the second lookup table includes an attribute value for one or more of a color, a fill pattern, and a line width.

16. The image rendering engine of claim 10, wherein the first lookup table comprises a texture encoded with attribute reference values.

17. The image rendering engine of claim 10, wherein the image shader is a vertex shader and further including a fragment shader stored in the memory which executes on the processor to render components of the image on the display device using the rasterizer.

18. The image rendering engine of claim 10, wherein the attribute reference value includes an integer index associated with one of the predetermined styles and the two dimensional texture map encodes the vertex attribute values using the integer index and the width of the two dimensional texture map.

19. An imaging system to be used with a processor, comprising:

a first routine stored on a computer-readable memory that, when executed on the processor, (1) obtains vector data, the vector data having a set of vertex data points, each vertex data point including location information data and an attribute reference pointer variable value, (2) obtains a first lookup table, the first lookup table having an attribute reference value stored for each of a set of different values of the attribute reference pointer variable, wherein the attribute reference value corresponds to a predetermined style for rendering a portion of an image on a display device relating to one or more of the vertex data points, and (3) obtains a second lookup table, the second lookup table comprising a two dimensional texture map encoding a set of predetermined styles indexed along one of the two dimensions of the texture map, wherein each predetermined style includes an encoded data value corresponding to a vertex attribute value for each of a plurality of different types of style attributes indexed along the other of the two dimensions of the texture map, and wherein each of the plurality of different types of style attributes corresponds to one of a plurality of distinct aspects of rendering portions of the image;

an image shader routine stored on the memory that, when executed on the processor, uses the first and the second lookup tables to determine the vertex attribute values associated with the predetermined style corresponding to each of the set of vertex data points based on one or more attribute reference pointer variable values assigned to the one or more vertex data points and produces image shader outputs based on the location information data and the vertex attribute values of the vertex data points; and a processing device that processes the image shader outputs to render the image on the display device based on the received vector data.

20. The imaging system of claim 19, wherein the processing device is a rasterizer.

21. The imaging system of claim 19, wherein the image shader is a vertex shader and the processing device includes a fragment shader stored on the computer readable memory.

22. The imaging system of claim 19, further including an image application stored in the memory that executes on the processor to obtain image data using the first routine and executes on the processor to render the image using the image shader routine and the processing device.

23. The imaging system of claim 22, wherein the image application regenerates the first lookup table without regenerating the second lookup table.

24. An image shader for use in an imaging system having a processor and a rasterizer, the image shader comprising:

a first data access routine stored on a memory that, when executed on the processor, accesses vector data, the vector data having a set of vertex data points, each vertex data point including location information data and an attribute reference pointer variable value, wherein the attribute reference value corresponds to a predetermined style for rendering a portion of an image on an image display device relating to one or more of the vertex data points;

a second data access routine stored on a memory that, when executed on the processor, accesses a first lookup table having an attribute reference value stored for each of a set of different values of the attribute reference pointer variable to determine a particular attribute reference value for a vertex data point, and that accesses a second lookup table comprising a two dimensional texture map encoding a set of predetermined styles indexed along one of the two dimensions of the texture map, wherein each predetermined style includes an encoded data value corresponding to a vertex attribute value for each of a plurality of different types of style attributes indexed along the other of the two dimensions of the texture map, and wherein each of the plurality of different types of style attributes corresponds to one of a plurality of distinct aspects of rendering portions of the image, to obtain a particular set of vertex attribute values associated with the vertex data point; and one or more image shader processing routines, which when executed on the processor, process the location information data and the vertex attribute values for each of the vertex data points to produce image shader outputs that are adapted to be used by the rasterizer to render the image on the image display device.

25. The image shader of claim 24, wherein the one or more image shader processing routines include a vertex shader processing routine that processes the location information data and the vertex attribute values for each of the vector data points to produce vertex shader outputs for each vertex data point, the vertex shader outputs comprising a vertex in a two-dimensional space including a two-dimensional location on an image screen and one or more display properties associated with the vertex in the two-dimensional space.

26. A map image rendering system, comprising:
a map database that stores map-related vector image data, the vector image data including a plurality of vertex points, each vertex point including location data specifying a location of a vertex in a virtual space and a vertex attribute reference; and a map image rendering device communicatively coupled to the map database to receive the map-related vector image data and to render a map image using the map-related vector image data, the map image rendering device including:
a communications network interface,
a processor,
a memory coupled to the processor,
a display device coupled to the processor,
a communications routine stored on the memory that executes on the processor to receive, via the communications network interface, vector data having a plurality of map vertex data points, each map vertex data point including location information data,
an attribute reference pointer determination routine that determines an attribute reference pointer variable value for each of the vertex data points;
a first lookup table decoding routine stored on the memory that executes on the processor to access a first lookup table having an attribute reference value stored for each of a set of different values of the attribute reference pointer variable values to determine a particular attribute reference value for a vertex data point, wherein the attribute reference value corresponds to a predetermined style for rendering a portion of the map image relating to the vertex data point;

a second lookup table decoding routine stored on the memory that executes on the processor to access a second lookup table comprising a two dimensional texture map encoding a set of predetermined styles indexed along one of the two dimensions of the texture map, wherein each predetermined style includes an encoded data value corresponding to a vertex attribute value for each of a plurality of different types of style attributes indexed along the other of the two dimensions of the texture map, and wherein each of the plurality of different types of style attributes corresponds to one of a plurality of distinct aspects of rendering portions of the image, the second lookup table decoding routine determining a set of vertex attribute values for each vertex data point based on the attribute reference value for each vertex data point, an image shader routine stored on the memory, which when executed on the processor, uses the vertex location information and the vertex attribute values for each of the received map vertex data points to produce image shader outputs, and a rasterizer that renders the map image on the display device using the image shader outputs.

27. The map image rendering system of claim 26, further including a map-related image application stored in the memory that executes on the processor to obtain map image data from the map database using the network communications routine and executes on the processor to render the map image on the display device using the image shader and the rasterizer.

28. The map image rendering system of claim 27, wherein the map-related image application obtains the second lookup table by receiving the second lookup table via the communications network interface from the map database.

29. The map image rendering system of claim 27, wherein the map-related image application obtains the second lookup table by generating the second lookup table and storing the second lookup table in the memory.

30. The map image rendering system of claim 27, wherein the map-related image application obtains the first lookup table by receiving the first lookup table via the communications network interface from the map database.

31. The map image rendering system of claim 27, wherein the map-related image application obtains the first lookup table by generating the first lookup table and storing the first lookup table in the memory.

32. The map image rendering system of claim 26, wherein the first lookup table comprises a two-dimensional texture.

* * * * *